3,202,708
SEPARATION OF DI-ORTHO SUBSTITUTED POLYCHLOROBENZOYL CHLORIDE FROM A CRUDE ISOMERIC MIXTURE OF POLYCHLOROBENZOYL CHLORIDES
Henry J. Gerjovich and Jean Bradley Harrison, Wilmington, Del., assignors to E. I. du Pont de Nemours and Company, Wilmington, Del., a corporation of Delaware
No Drawing. Filed Aug. 1, 1962, Ser. No. 213,869
1 Claim. (Cl. 260—544)

This invention relates to processes for isolating the herbicidal polychlorobenzoic acids from crude chlorinated benzoyl chloride mixtures.

More specifically, this invention refers to a novel process for separating di-orthochloro substituted benzoyl chlorides from a poly-isomer mixture of polychlorobenzoyl chlorides.

Historically, costly fractional distillation procedures have been used to separate the herbicidal polychlorinated benzoyl chlorides from crude poly-chloro benzoyl chloride mixtures which contain several herbicidally inactive and weak isomers. The polychlorinated compounds having two orthochloro atoms, ortho to the carbonyl group, are the most effective herbicidal isomers while those isomers having one or no orthochloro atoms, ortho to the carbonyl group, are herbicidally weak or inactive. Separate hydrolysis of the appropriate distillation fraction yields the corresponding chlorinated acid in one process familiar to the art. This process is very costly and extremely tedious. Another method of separating the desirable polychlorinated benzoyl chlorides, equally as tedious, has been by fractional crystallization procedures. See British Patent 833,218 issued April 21, 1960, page 2, lines 40–50 and Girard U.S. Patent 2,848,470 issued August 19, 1958, column 2, lines 10–17. Recently a process was developed for the production of an isomer-mixture of chlorinated benzoic acid containing more than 60% by weight of the most active herbicidal isomers, 2,3,6-trichlorobenzoic acid and 2,3,5,6-tetrachlorobenzoic acid. See Girard U.S. Patent 2,975,211 issued March 14, 1961.

It is now discovered according to this invention that a better than 90% pure grade of the most herbicidally active di-ortho substituted polychlorinated benzoic acids or their acid chlorides can be isolated from crude isomeric-mixtures of polychlorinated benzoyl chlorides at commercially desirable yields and prices.

According to this invention a crude mixture of polychlorinated benzoyl chlorides is broken down into finely dispersed organic phase droplets and then contacted with at least a sufficient amount of alkali to maintain the entire solution slightly alkaline. The residual organic phase composed of essentially pure di-orthochloro substituted benzoyl chloride is separated from the alkaline medium.

The amazing results brought about by the process of this invention are the net result of the selective alkaline hydrolysis of the reactive chlorinated benzoyl chlorides to their corresponding soluble benzoic acid, salts and removal of the unreacted insoluble 2,6-substituted benzoyl chlorides from the alkaline medium. The degree to which the undesirable non di-orthochloro isomers are removed by hydrolysis depends directly upon the intimacy of contact of the crude polychlorinated benzoyl chlorides with the aqueous alkali. By this is meant the crude benzoyl chloride mixture is finely dispersed throughout the aqueous alkali by vigorous mechanical agitation, immersion in a polar solvent, contact with an emulsifying agent or any combination of these.

Although considerable contact between the alkali and crude poly-chloro benzoyl chloride mixtures can be achieved by merely applying vigorous mechanical agitation, the addition of an emulsifying agent combined with vigorous agitation improves the degree of contact between the two reactants.

Emulsifying agents not reactive with the crude benzoyl chloride isomers are preferred. These include non-ionic and anionic surfactants such as sodium oleate alkyl aryl sulfonates including dodecylbenzenesulfonic acid, sodium salt; alkylated phenol ethylene oxide condensation product and higher alcohols including ethoxylated nonyl phenol, trimethyl nonyl alcohol, ethylene oxide addition production; sorbitan fatty acid esters and the reaction product of such esters with ethylene oxide; and mixtures of sulfonated and ethoxylated surfactants.

Generally, the addition of 1 to 5% by weight of the emulsifying agent as related to the weight of the crude benzoyl chloride mixture is sufficient for the practice of this invention.

With or without the presence of an emulsifying agent, it is especially advantageous to contact the aqueous alkali with the crude benzoyl chloride mixtures by first dissolving the latter in an inert polar, highly water miscible solvent. The crude mixture, dissolved in a polar solvent, is gradually added to a vigorously agitated dilute aqueous alkaline solution.

Polar solvents that can be used include ketones, such as acetone, methyl ethyl ketone; N,N-dialkyl amides such as dimethyl formamide, dimethylacetamide; and cyclic ethers such as tetrahydrofuran, dioxane; and dimethyl sulfoxide.

The amount of polar solvent used is 1 to 2 parts by weight of solvent combined with the crude benzoyl chloride mixture.

The concentration of aqueous alkali used in this invention is not critical. However, it is preferred that it be from 1 to 40% by weight. Preferred alkalies include calcium hydroxide, potassium hydroxide or sodium hydroxide. It is especially preferred to use sodium hydroxide as the alkali. Although a large excess of alkali can be used, it is generally more advantageous to contact the benzoyl chloride mixture with only 1 to 5% by weight excess of alkali above the amount theoretically consumed by the non-di-ortho-substituted benzoyl chlorides.

The exact amount of alkali required for the hydrolysis of the undesirable benzoyl chlorides for any given crude mixtures can be determined previously on an aliquot sample or directly on the entire run by examining the rapid build up of the chloride ions. Alternatively, the exact amount of alkali needed can be determined by vapor phase chromatography of the organic phase. When the aqueous chloride concentration levels off, hydrolysis of the undesirable isomers is completed.

In the process of this invention, it is found that by controlling the exothermic interaction of the alkali with the acid chloride mixture in a range of 5 to 50° C., preferably between 25 and 40° C., more economical isolation of the desired di-ortho substituted benzoyl chloride mixture is achieved. Contacting the acid chloride mixture in the form of finely dispersed droplets with aqueous alkali for longer than 30 minutes should be avoided if maximum isolation of the available di-ortho substituted benzoyl chlorides is to be achieved.

This invention is alternatively described by the following equation:

(1) 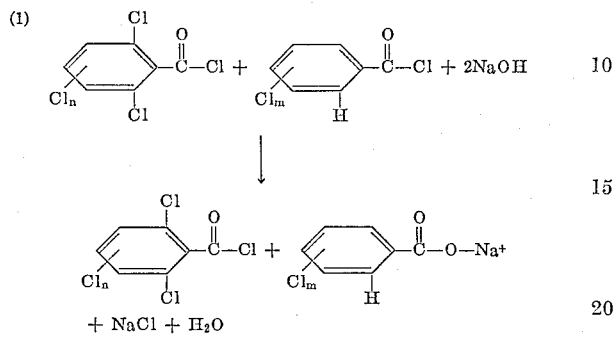
$+ NaCl + H_2O$ wherein $n$ equals 0, 1, or 2 and
$m$ equals 0, 1, 2, 3 or 4.

It is understood that there will always be two moles of NaOH for each mole of

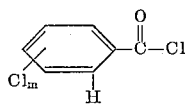

in the above description.

At this point the herbicidally active 2,6-dichloro-substituted benzoyl chlorides which remain as the organic phase are removed from the aqueous alkali phase by siphon, decantation or extraction procedures. The 2,6-substituted benzoyl chlorides from Equation 1 are converted to the corresponding sodium salts, if desired, by heating to 90 to 120° C. while stirring the isolated organic layer with excess fresh aqueous alkali until solution of the organic phase occurs. This process generally takes from five minutes to one hour. Subsequent acidification of the latter alkaline solution yields the herbicidally active 2,6-dichloro-substituted benzoic acids in high purity.

In addition to the examples given above, this invention can be better understood by reference to the following examples.

*Example 1*

A batch of polychlorinated benzoic acids prepared by the process as described in Girard U.S. Patent 2,975,211 was shown to have the following typical isomer content by vapor phase chromatography.

| Component | Percent | Grams | Moles |
|---|---|---|---|
| Unknown | Trace | Trace | |
| 2,5- | 2.5 | 25 | 0.119 |
| 3,4- | 0.5 | 5 | 0.024 |
| 2,4,6- | 3.0 | 30 | 0.123 |
| 2,3,6- | 61.0 | 610 | 2.50 |
| 2,4,5- | 23.0 | 230 | 0.945 |
| 2,3,5,6- | 1.0 | 10 | 0.036 |
| 2,3,4- | 9.0 | 90 | 0.370 |
| | 100.0 | | 4.117 |

This isomeric mixture of chlorobenzoic acids is converted to the corresponding benzoyl chloride isomeric mixture by refluxing with excess of thionyl chloride until sulfur dioxide and hydrogen chloride cease to evolve from the reaction. Excess thionyl chloride is topped off the reaction mixture under reduced pressure. The undesirable isomers in the above mixture are underlined and in the form of acyl chloride represent 1.46 mole wgt. equivalents which consume 2.92 mole wgt. alkali as shown by the following equation:

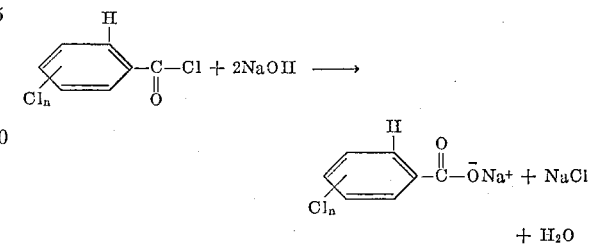
$+ H_2O$ wherein $n$ is a whole positive integer of 2 through 4.

Eight parts by weight of water are vigorously stirred while adding from one stream 1 part by weight of mixed chlorinated benzoic acid chlorides derived from the above sample, and from a second stream a solution of 0.121 part by weight of sodium hydroxide in 0.5 part by weight of water. The addition takes 10–30 minutes. The two addition streams are regulated so that the molar amount of added caustic is always $7/10$ of the total molar amount of added chlorides i.e., NaOH/"other than 2,6-dichloro substituted isomers"=2/1. Heat is generated and cooling is employed to maintain the reaction mixture at 25–32° C. After the addition is complete, the reaction mixture is stirred for 15 minutes more. The heavy organic oil is allowed to settle out and the aqueous solution is separated. The oil is washed one time with water. This oil analyzed by vapor phase chromatography consists of the following benzoyl chloride isomers:

| | Grams | Mole weight equivalent |
|---|---|---|
| 2,4,6- | 30 | 0.123 |
| 2,3,6- | 610 | 2.500 |
| 2,3,5,6- | 10 | 0.036 |
| | | 2.659 |

*Example 2*

The procedure is identical to Example 1, except that .025 part by weight of p-dodecylbenzene sulfonic acid is combined with one part by weight of mixed chlorides prior to its contact with eight parts of water and 0.127 part by weight of sodium hydroxide contained in .5 part by weight of water is added over a 30 minute period.

*Example 3*

One part by weight of the mixed chlorides of Example 1 is combined with one part by weight of acetone and added to a vigorously stirring solution of .200 part by weight of sodium hydroxide contained in seven parts by weight of water over a 15 minute period with external cooling to maintain the temperature in a range of 30–35° C. When the acid chloride addition is completed, the organic phase is stirred for an additional 10 minutes, separated and washed twice with cold water. This oil consists of 94%+ of a herbicidal commodity, the di-ortho substituted herbicidal benzoyl chlorides as follows:

2,3,6-trichlorobenzoyl chloride _____ 93.8
2,3,5,6-tetrachlorobenzoyl chloride _____ 1.5
Other polychlorinated benzoyl chloride isomers ___ 4.7

100.0

*Example 4*

As in Example 1 above a crude chlorinated benzoic acid mixture obtained from Heyden Chemical Company which contained the following components as determined during analysis by gas chromatography was converted to its corresponding benzoyl chlorides conveniently with thionyl chloride.

TBA isomer component: Percent of mixture
| Isomer | % |
|---|---|
| 2,5- | 0.8 |
| 2,4,6- | 1.5 |
| 2,3,6- | 64.2 |
| 2,4,5- | 22.9 |
| 2,3,4- | 8.9 |
| 2,3,5,6- | 1.7 |
| | 100.0 |

A total of 108.3 pounds of crude chlorinated benzoyl chloride derived from the Heyden product above is diluted with 25 pounds of dry acetone. This acetone solution is added gradually and concurrently with a 25% solution of sodium hydroxide to a vessel containing 150 pounds of rapidly agitated water, at a rate to maintain the pH range of the aqueous reaction above 10. Cooling is needed to keep this reaction at 26–32° C.

The reaction is completed in two hours. The organic layer is separated and added gradually to 200 pounds of water containing 23.8 pounds of sodium hydroxide, and refluxed with stirring to effect solution. After cooling the aqueous sodium salt TBA solution is neutralized with 29.4 pounds of concentrated hydrochloric acid to give solid 2,3,6-TBA. The product is filtered and dried. Analysis by gas chromatography shows:

| Isomer: | Percent |
|---|---|
| 2,4,6- | 2.2 |
| 2,3,6- | 95.2 |
| 2,3,5,6- | 2.6 |

*Example 5*

A batch of polychlorinated benzoyl chlorides prepared by the process as described in Britist Patent 833,218 was shown to have the following isomer content by vapor phase chromatography:

| Isomer component | Percent | Grams | Moles |
|---|---|---|---|
| 2,5- | 12.3 | 123.0 | .590 |
| 3,4- | 1.0 | 10.0 | .048 |
| 2,3,6- | 7.8 | 78.0 | .320 |
| 2,3,5- | 16.3 | 163.0 | .685 |
| 2,4,5- | 6.0 | 60.0 | .246 |
| 3,4,5- | 1.5 | 15.0 | .062 |
| 2,3,5,6- | 36.4 | 364.0 | 1.310 |
| 2,3,4,5- | 15.3 | 153.0 | .551 |
| 2,3,4,5,6- | 3.4 | 34.0 | .110 |
| | | | 3.922 |

One part by weight of the above benzoyl chloride mixture is mixed with one part by weight of acetone. The isomeric mixture of chlorobenzoic acids is converted to the corresponding benzoyl chloride isomeric mixture by refluxing with excess of thionyl chloride until sulfur dioxide and hydrogen chloride cease to evolve from the reaction. Excess thionyl chloride is topped off the reaction mixture under reduced pressure. The undesirable isomers in the above mixture are underlined. In the form of acyl chloride they represent 2.18 mole wgt. equivalents which consume 4.36 mole wgt. of NaOH. The oily layer which separates after admixing the reaction mixture with NaOH consists of the following di-orthochloro benzoyl chloride isomers:

| | Grams | Percent |
|---|---|---|
| 2,3,6- | 77.0 | 16 |
| 2,3,5,6- | 363.0 | 76 |
| 2,3,4,5,6- | 34.0 | 8 |

This represents a 92% active herbicidol commodity.

Corresponding isomeric sodium salt solutions are obtained by heating the di-orthochloro benzoyl chloride mixtures of this invention with aqueous alkali sufficient to effect solution. Acidification of this aqueous alkaline solution yields the free acids in the same isomeric ratio as the starting benzoyl chlorides.

Other compounds such as the Tergitols, oleic acid, the inert polar highly water miscible solvents dioxane, dimethyl sulfoxide acetic acid and dimethyl formamide can be used as effectively to promote intimate contact of the benzoyl chlorides with aqueous alkali as the acetone, dodecylbenzene sulfonic acid and agitation described in the examples above.

The invention claimed is:

A process for separating 2,6-dichloro substituted benzoyl chloride isomers from a mixture of polychlorinated benzoyl chlorides, the steps comprising vigorous mechanical agitation for up to 30 minutes of the mixture of benzoyl chloride isomers, at a temperature of 5 to 50° C., with about two moles of aqueous alkali per mole of the benzoyl chloride isomers not substituted with chlorine atoms in both the two and six positions and then collecting and drying the product remaining as the insoluble organic phase.

References Cited by the Examiner

UNITED STATES PATENTS 1,942,826 1/34 Mills _____ 260—525 XR
3,014,965 12/61 Newcomer et al. __ 260—544 XR

FOREIGN PATENTS 1,112,509 8/61 Germany.
1,114,178 9/61 Germany.
1,121,041 1/62 Germany.

LORRAINE A. WEINBERGER, *Primary Examiner.*

HAROLD G. MOORE, LEON ZITVER, *Examiners.*